(12) United States Patent
Sugaya et al.

(10) Patent No.: US 7,545,792 B2
(45) Date of Patent: Jun. 9, 2009

(54) CHANNEL ALLOCATION METHOD, COMMUNICATION SYSTEM, AND WIRELESS COMMUNICATION APPARATUS IN WIRELESS NETWORK

(75) Inventors: Shigeru Sugaya, Kanagawa (JP); Mitsuhiro Suzuki, Chiba (JP)

(73) Assignee: Sony Corporation (JP)

( * ) Notice: Subject to any disclaimer, the term of this patent is extended or adjusted under 35 U.S.C. 154(b) by 1012 days.

(21) Appl. No.: 10/163,979

(22) Filed: Jun. 6, 2002

(65) Prior Publication Data

US 2003/0060207 A1    Mar. 27, 2003

(30) Foreign Application Priority Data

Jun. 8, 2001    (JP)    ............................ P2001-212856

(51) Int. Cl.
  *H04J 3/00*    (2006.01)
  *H04J 3/16*    (2006.01)
  *H04B 7/212*    (2006.01)

(52) U.S. Cl. .................. 370/345; 370/437; 370/442

(58) Field of Classification Search .................. 370/321, 370/345, 347, 437, 442, 443
  See application file for complete search history.

(56) References Cited

U.S. PATENT DOCUMENTS

| 3,851,104 | A | * | 11/1974 | Willard et al. ............... 370/442 |
| 5,239,682 | A | * | 8/1993 | Strawcynski et al. ........ 455/436 |
| 5,515,379 | A |   | 5/1996 | Crisler et al. |
| 5,594,738 | A | * | 1/1997 | Crisler et al. ............... 370/347 |
| 5,974,310 | A | * | 10/1999 | Bilgic .......................... 455/418 |
| 6,097,717 | A | * | 8/2000 | Turina et al. ................. 370/348 |
| 6,333,937 | B1 | * | 12/2001 | Ryan ........................... 370/468 |
| 6,466,557 | B1 | * | 10/2002 | Doi .............................. 370/332 |
| 6,975,867 | B2 | * | 12/2005 | Ito et al. ...................... 455/450 |
| 2002/0031119 | A1 | * | 3/2002 | Brouet et al. ................ 370/386 |

FOREIGN PATENT DOCUMENTS

| JP | 11-177617 A | 7/1999 |
| JP | 2000-004244 A | 1/2000 |
| JP | 2000-307601 A | 11/2000 |
| JP | 2001-036581 A | 2/2001 |
| JP | 2001-111599 A | 4/2001 |
| WO | WO-98/09469 | 3/1998 |

\* cited by examiner

*Primary Examiner*—Hong Cho
(74) *Attorney, Agent, or Firm*—Lerner, David, Littenberg, Krumholz & Mentlik, LLP

(57) ABSTRACT

In a wireless communication system with a periodical frame structure, as a method for transmitting information using an allocated channel over a plurality of frames by a single channel allocation request, an allocated channel is released when transmission is terminated or when a communication apparatus is disconnected from a network, and a channel can be allocated over a plurality of continuous frames.

17 Claims, 15 Drawing Sheets

CHANNEL ALLOCATION METHOD, COMMUNICATION SYSTEM, AND WIRELESS COMMUNICATION APPARATUS IN WIRELESS NETWORK

BACKGROUND OF THE INVENTION

1. Field of the Invention

The present invention relates to channel allocation methods, wireless communication systems, and wireless communication apparatuses in wireless networks.

2. Description of the Related Art

A circuit-switching wireless transmission method, such as that used by cellular phones, sets a transmission frame period, defines a partial area of the frame period as a slot, and exclusively uses the slot for transmitting information from a communication apparatus.

In such a known wireless transmission system, a method is used in which a slot allowed to be exclusively used by a user is continuously used by that user unless the user disconnects from the line. In other words, a protocol is designed to prevent undesired interruption of using a transmission line against a user's will once a slot is allocated to be exclusively used.

The IEEE (Institute of Electrical and Electronics Engineers) has proposed the IEEE 802.11 standard, in which an optimal protocol for performing asynchronous wireless transmission is defined as a wireless LAN transmission method.

In contrast, various proposals have been made for wireless transmission systems having a periodical frame structure. For example, HiperLAN2 and Wireless 1394 have been considered. In these wireless transmission systems with a frame structure, a channel allocation transmission method for allocating in advance a channel for transmission prior to transmitting information has been used. In the channel allocation transmission method, generally channel allocation is performed in each frame period, which is defined periodically.

Referring to FIG. 18, as an example of a method for performing channel allocation in each frame period, a known case in which channel allocation is performed in only one frame will now be described. Portions (A) to (D) of FIG. 18 correspond to a first frame to a fourth frame, respectively, of a series of frames.

In FIG. 18, a predetermined transmission frame period is determined by transmitting network broadcast information B31 and B32.

A communication apparatus that wants to make a channel allocation request transmits a channel allocation request Q31 in an allocation area of the second frame (portion (B) of FIG. 18).

A network control station receives the channel allocation request Q31. If the channel can be allocated, the control station specifies a transmission area to be allocated by transmitting network broadcast information B33 in the third frame (portion (C) of FIG. 18).

The information sender, that is, the communication apparatus that has sent the channel allocation request, receives the network broadcast information B33 and transmits information using the allocated channel S31 in the third frame (portion (C) of FIG. 18) in accordance with parameters of the network broadcast information B33.

In the fourth frame (portion (D) of FIG. 18), the control station transmits network broadcast information B34, which is not specifying a transmission area to be allocated, thereby terminating the channel allocation transmission.

In known wireless transmission systems, generally information to be transmitted is discontinuous. Accordingly, the entire processing is designed to be completed by one channel allocation request.

FIG. 17 shows examples of frames in which continuous channel allocation is performed by a known method. Portions (A) to (G) of FIG. 17 correspond to a first frame to a seventh frame, respectively, of a series of frames.

Referring to FIG. 17, a predetermined transmission frame period is determined by transmitting network broadcast information B41 and B42.

A communication apparatus that wants to make a channel allocation request transmits a channel allocation request Q41 in an allocation area of the second frame (portion (B) of FIG. 17). The network control station receives the channel allocation request Q41. If the channel can be allocated, the control station specifies a transmission area to be allocated by transmitting network broadcast information B43 in the third frame (portion (C) of FIG. 17). The information sender (terminal station) receives the network broadcast information B43 and transmits information using the allocated channel S41 in accordance with parameters (transmission start/end time) of the network broadcast information B43.

In order to continuously transmit information, the information sender transmits a channel allocation request Q42 in an allocation area of the third frame (portion (C) of FIG. 17).

The network control station receives the channel allocation request Q42. If the channel can be allocated, the control station specifies a transmission area to be allocated by transmitting network broadcast information B44 in the fourth frame (portion (D) of FIG. 17).

The information sender receives the network broadcast information B44 and transmits information using the allocated channel S42 in accordance with parameters (transmission start/end time) of the network broadcast information B44. In order to continuously transmit information in the fifth frame, prior to sending the information using the allocated channel S42, the information sender transmits a channel allocation request Q43 in an allocation area of the fourth frame (portion (D) of the fourth frame).

The network control station receives the channel allocation request Q43. If the channel can be allocated, the control station specifies a transmission area to be allocated by transmitting network broadcast information B45 in the fifth frame (portion (E) of FIG. 17). The information sender receives the network broadcast information B45 and transmits information using the allocated channel S43 in accordance with parameters (transmission start/end time) of the network broadcast information B45. At the same time, the information sender transmits a channel allocation request Q44 in an allocation area of the subsequent frame in order to continuously transmit information in the subsequent frame.

The network control station receives the channel allocation request Q44. If the channel can be allocated, the control station specifies a transmission area to be allocated by transmitting network broadcast information B46 in the sixth frame (portion (F) of FIG. 17). The information sender receives the network broadcast information B46 and transmits information using the allocated channel S44 in accordance with parameters (transmission start/end time) of the network broadcast information B46. Since the information sender does not continuously send information in the subsequent frame, the information sender transmits no information in an allocation area.

In the seventh frame (portion (G) of FIG. 17), the control station transmits network broadcast information B47, which does not specify a transmission area to be allocated, thereby terminating the channel allocation transmission.

The above-described known technology has the following problems:

In circuit-switching wireless communication systems, such as those used by cellular phones, communication protocols have been designed to prevent disconnection of a wireless transmission link. A slot is not released unless a user makes a disconnection request. If such known circuit-switching communication protocols are applied to wireless LAN systems, a slot allocated to a terminal station cannot be released when a link cannot be established between the control station and the terminal station, that is, when the terminal station moves out of a communication range of the control station.

In a wireless network configured by combining a plurality of wireless communication apparatuses, one medium is occupied when a large amount of information is streaming-transmitted over a long period of time from one communication apparatus to another. In order to solve this problem, a method of setting a transmission frame period and exclusively using a partial area of the frame period for streaming transmission is devised.

With a known method such as that shown in FIG. 17, processing involved in allocating a transmission channel must be continuously performed as long as streaming transmission continues, and hence the same channel allocation request must be repeatedly made. When transmission channel allocation processing cannot be performed in this known scheme, streaming transmission is interrupted. When such a scheme is adopted by general wireless LAN systems with a frame structure, channel allocation must be continuously performed in frame units.

In wireless LAN systems, a link between the information sender and the information receiver may become unstable due to the positional relationship between the two apparatuses, the distance between the two apparatuses, and the occurrence of an obstacle, and hence a channel may not be temporarily allocated. In such a case, often times streaming transmission may not be performed. Even when streaming transmission starts, it may be frequently interrupted.

In FIGS. 17 and 18, examples in which a frame period set by a beacon is constant have been illustrated. As disclosed by PCT International Publication No. WO98/09469, the following problem occurs when a beacon transmission interval (frame period) is variable in order to prevent wireless beacons transmitted from a base station from colliding with one another. Specifically, the frame length changes every time. For example, it is desirable to have a channel of 20 Mbps in order to perform streaming transmission. However, since the frame period is short, it is impossible to allocate a time slot operating at 20 Mbps in one frame. In such a case, data is transmitted in a plurality of frames. If a transmitting terminal and a receiving terminal are not informed of information indicating such regulations, data transmission/reception time can only be determined every time after a beacon is heard. When data is transmitted in a plurality of frames, the receiving terminal needs to perform processing such as temporarily storing the received information in a buffer.

SUMMARY OF THE INVENTION

In order to solve the foregoing problems, it is a first object of the present invention to provide a method for continuously performing channel allocation over a plurality of frames in a wireless communication system with a periodical frame structure in which information is transmitted on an allocated channel using part of the frame.

It is a second object of the present invention to switch between one-time channel allocation and continuous channel allocation depending on the application to be transmitted.

In order to achieve the foregoing objects, a first method is a method for allocating, when streaming transmission is performed for a prolonged period of time, a transmission channel in which no termination time is set and for releasing the allocated transmission channel when transmission is terminated.

When a communication apparatus that has been performing streaming transmission is disconnected from a wireless network, a control station of the wireless network releases a transmission channel allocated to the communication apparatus.

In order to achieve the foregoing objects, a second method is a method for allocating a transmission channel in which a termination time (the number of frames) is set beforehand when streaming transmission is performed for a long period of time.

When the termination time is reached, the method again sets a termination time (the number of frames) and allocates a transmission channel in order to continuously perform the streaming transmission.

In order to achieve the foregoing objects, the present invention has the following features:

In accordance with a first aspect of the present invention, a wireless communication system is provided including a plurality of wireless communication apparatuses, among which wireless communication is performed using a predetermined frame period. The wireless communication apparatuses each transmit a channel allocation request to a control station by using part of the frame period. The control station transmits channel allocation information in response to the channel allocation request from each of the wireless communication apparatuses. The wireless communication apparatuses each perform wireless communication using a channel allocated by the control station. A channel is allocated over a plurality of frames by a single channel allocation request.

A partial channel of the frame is allocated when transmission starts. Subsequently, the partial channel of the frame is exclusively used. When the transmission is terminated, the channel is released. When the wireless communication apparatus for which a channel has been allocated is disconnected from the network, the control station of the network may determine that the transmission is terminated and may release the channel.

Channel allocation request information for performing channel allocation may include information on the number of frames in which channel allocation is continuously performed.

In accordance with a second aspect of the present invention, a wireless communication method using a predetermined frame period is provided. The wireless communication method includes the steps of transmitting a channel allocation request to a control station from a wireless communication apparatus belonging to a wireless network formed by the control station; receiving, by the wireless communication apparatus, channel allocation information from the control station; and performing wireless communication using a channel allocated by the control station. A channel is allocated over a plurality of frames by a single channel allocation request.

When performing channel allocation, the method determines a termination time when transmission starts. In order to continuously transmit information using the allocated channel, the channel is again allocated before the termination time is reached.

Channel allocation request information for performing channel allocation may include information on the number of frames in which channel allocation is continuously performed.

In accordance with a third aspect of the present invention, a wireless communication apparatus for performing wireless communication using a predetermined frame period is provided. The wireless communication apparatus includes a wireless communication unit for transmitting a channel allocation request for transmitting information on an allocated channel and for receiving channel allocation information from a control station; and a controller for controlling the wireless communication unit, whereby information transmission is performed using part of the frame period based on the channel allocation information. A channel is allocated over a plurality of frames by a single channel allocation request.

In accordance with a fourth aspect of the present invention, a wireless communication apparatus for performing wireless communication using a predetermined frame period is provided. The wireless communication apparatus includes a unit for managing, as a control station, a wireless network formed by a plurality of wireless communication apparatuses; a unit for receiving a channel allocation request from each of the wireless communication apparatuses belonging to the network; and a unit for allocating part of the frame period to the wireless communication apparatus that has transmitted the channel allocation request. A channel is allocated over a plurality of frames by a single channel allocation request.

According to the present invention, in a wireless communication system with a periodical frame structure, a channel can be continuously allocated over a plurality of frames when information is transmitted on an allocated channel using part of the frame.

By continuously allocating the channel over a plurality of frames, information can be continuously transmitted and received even if a signal indicating channel allocation, which is sent from the control station, cannot be received due to a change in the wireless transmission environment.

DESCRIPTION OF THE PREFERRED EMBODIMENTS

The present invention will be understood from the following description of the preferred embodiments with reference to the accompanying drawings.

Example of Configuration of Wireless Network

Figure 1:
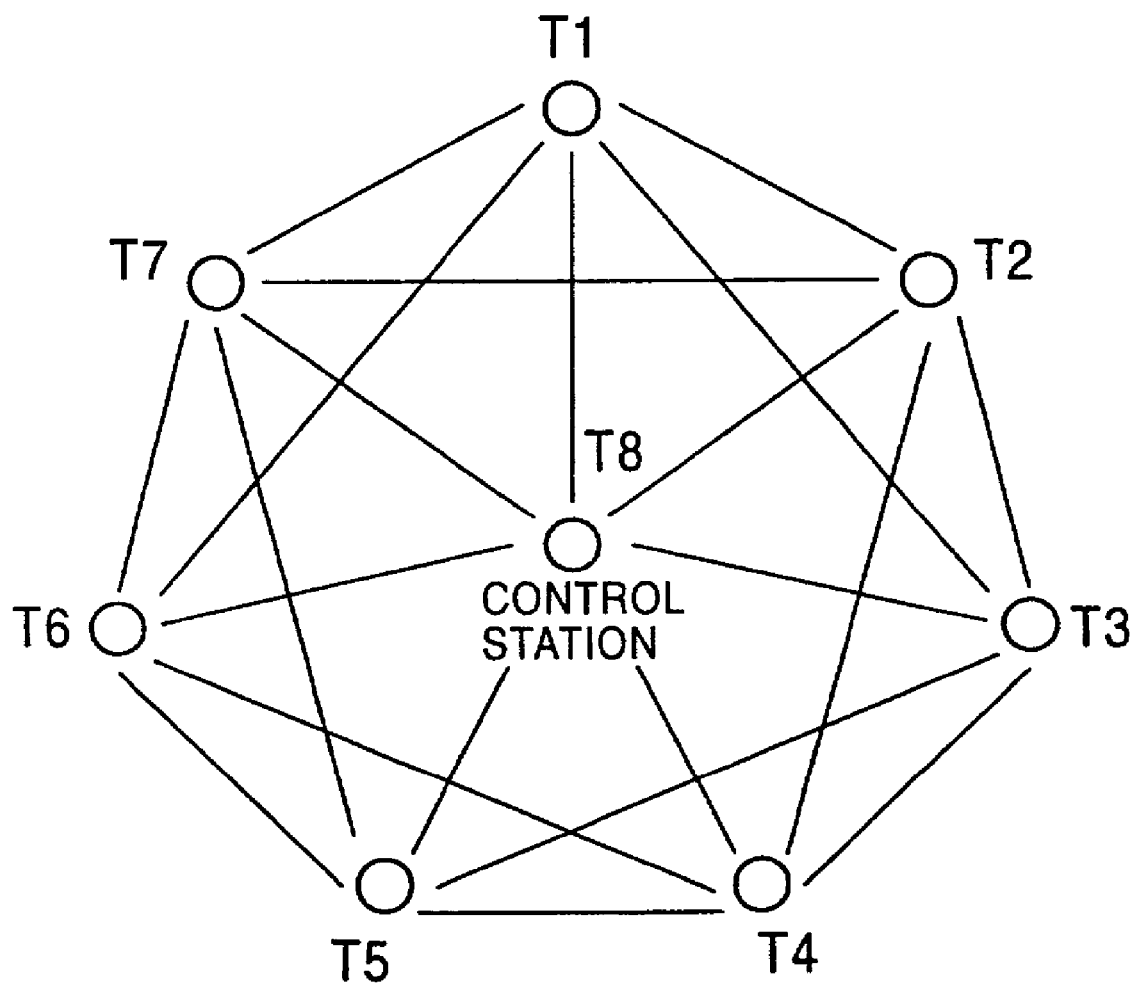
FIG. 1 illustrates an example of the configuration of a wireless network system.

An example of the configuration of a wireless network system according to an embodiment of the present invention will now be described. FIG. 1 illustrates an example of the configuration of a wireless network system with a plurality of wireless communication apparatuses T1 to T8. Each of the communication apparatuses T1 to T8 is a wireless communication apparatus capable of transmitting and receiving signals by a predetermined transmission scheme.

In the example shown in FIG. 1, the communication apparatus T8 functions as a control station of the wireless network shown in FIG. 1. The rest of the wireless communication apparatuses T1 to T7 function as terminal stations belonging to the wireless network, and transmit and receive wireless signals to and from one another. The communication apparatus T8 can easily communicate with all the other communication apparatuses T1 to T7. Thus, the communication apparatus T8 is located at an appropriate position at which the communication apparatus T8, which is the control station, can transmit control information to the communication apparatuses T1 to T7, which are the terminal stations.

In the wireless network in the example shown in FIG. 1, each communication apparatus is not necessarily capable of directly and wirelessly communicating with all the other communication apparatuses. In the example shown in FIG. 1, for example, the communication apparatus T1 is located at a position relatively near the communication apparatuses T2, T7, and T8. Accordingly, the communication apparatus T1 can easily transmit information to the communication apparatuses T2, T7, and T8 since information will not be lost by wireless signal attenuation. In contrast, since the communication apparatus T1 is located at a position relatively far from the communication apparatuses T3 and T6, information transmission may become more or less difficult. Since the communication apparatus T1 is far from the communication apparatuses T4 and T5, the communication apparatus T1 cannot perform direct and wireless communication with the communication apparatuses T4 and T5.

Similarly, each of the other communication apparatuses T2 to T7 has a communication apparatus(es) to which information can be easily transmitted, a communication apparatus(es) to which information can be transmitted with difficultly, and a communication apparatus(es) to which information cannot be transmitted.

Example of Configuration of Wireless Communication Apparatus

An example of the configuration of the wireless communication apparatus forming the wireless network will now be described. The wireless communication apparatus has a wireless transmitter for performing a transmission function and a wireless receiver for performing a reception function.

Example of Configuration of Wireless Transmitter

Figure 2:
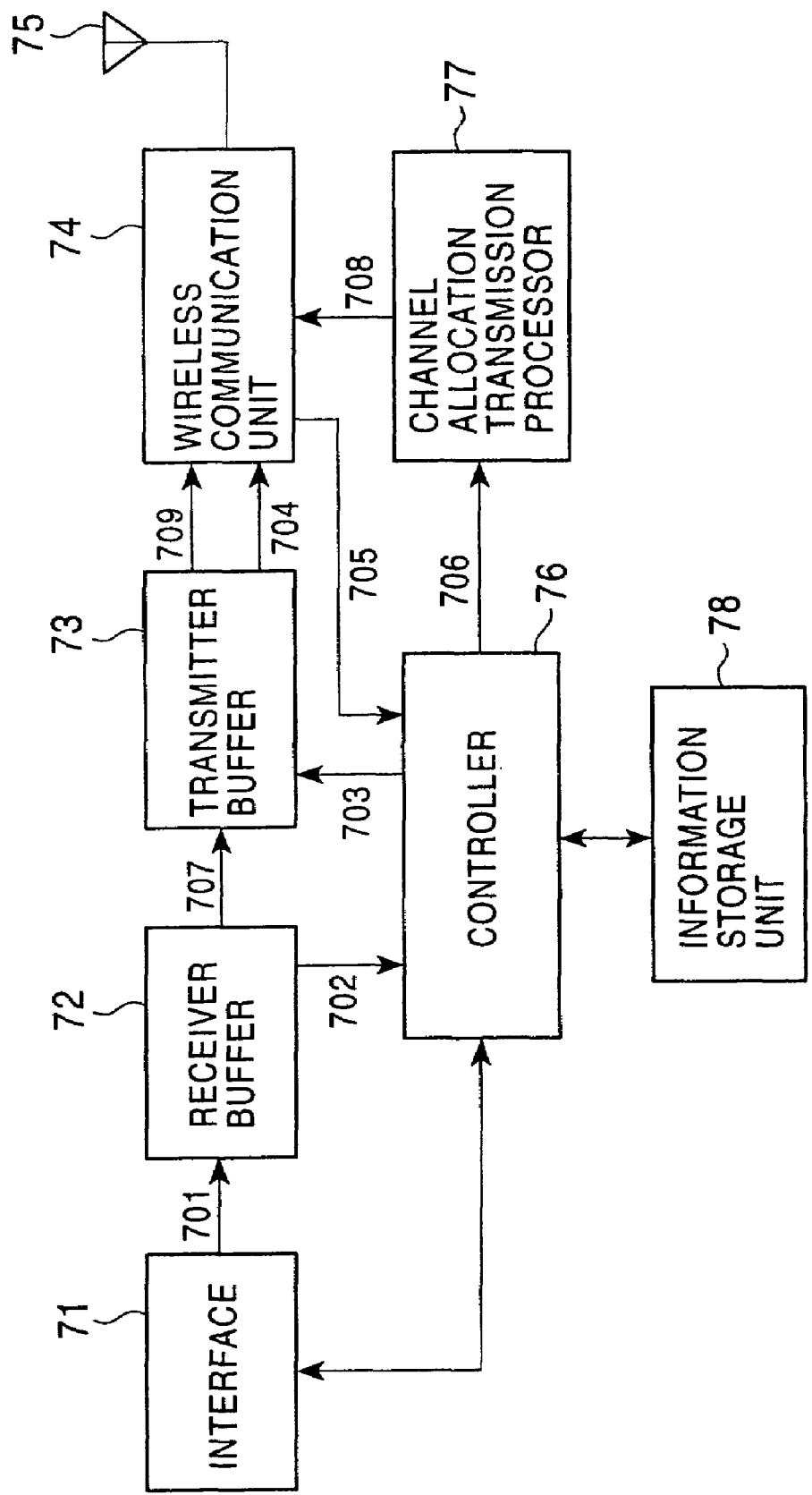
FIG. 2 is a block diagram showing an example of the configuration of a wireless transmitter of a wireless communication apparatus.

FIG. 2 illustrates an example of the configuration of the wireless transmitter of the wireless communication apparatus.

The wireless transmitter has an interface 71 for connecting to an external apparatus (not shown) and a receiver buffer 72 for temporarily storing media information 701, which is wirelessly transmitted from the external apparatus.

The communication apparatus also has a controller 76 for performing a series of transmission processes. If it is determined from a wireless transmission notice 702 that it is necessary to transmit information using an allocated channel, a channel allocation request 703 is stored in a transmitter buffer 73 for wireless transmission. By using a predetermined request area, a channel allocation request 704 is wirelessly transmitted to the control station through a wireless communication unit 74 from an antenna 75.

Network broadcast information, which is periodically transmitted from the control station through the antenna 75, is demodulated by the wireless communication unit 74 into a signal 705, and the signal 705 is sent to the controller 76. The controller 76 supplies corresponding channel allocation information 706 to an allocation transmission processor 77.

The information stored in the receiver buffer 72 is supplied as predetermined transmission information to the transmitting buffer 73. The allocation transmission processor 77 performs wireless transmission control 708 so that information is transmitted at a predetermined time in a frame period. As a result, transmission information 709 is wirelessly transmitted at that predetermined time.

A series of control processes is performed by instructions given by the controller 76. The controller 76 includes an information storage unit 78 for storing various transmission control programs and control information.

Figure 3:
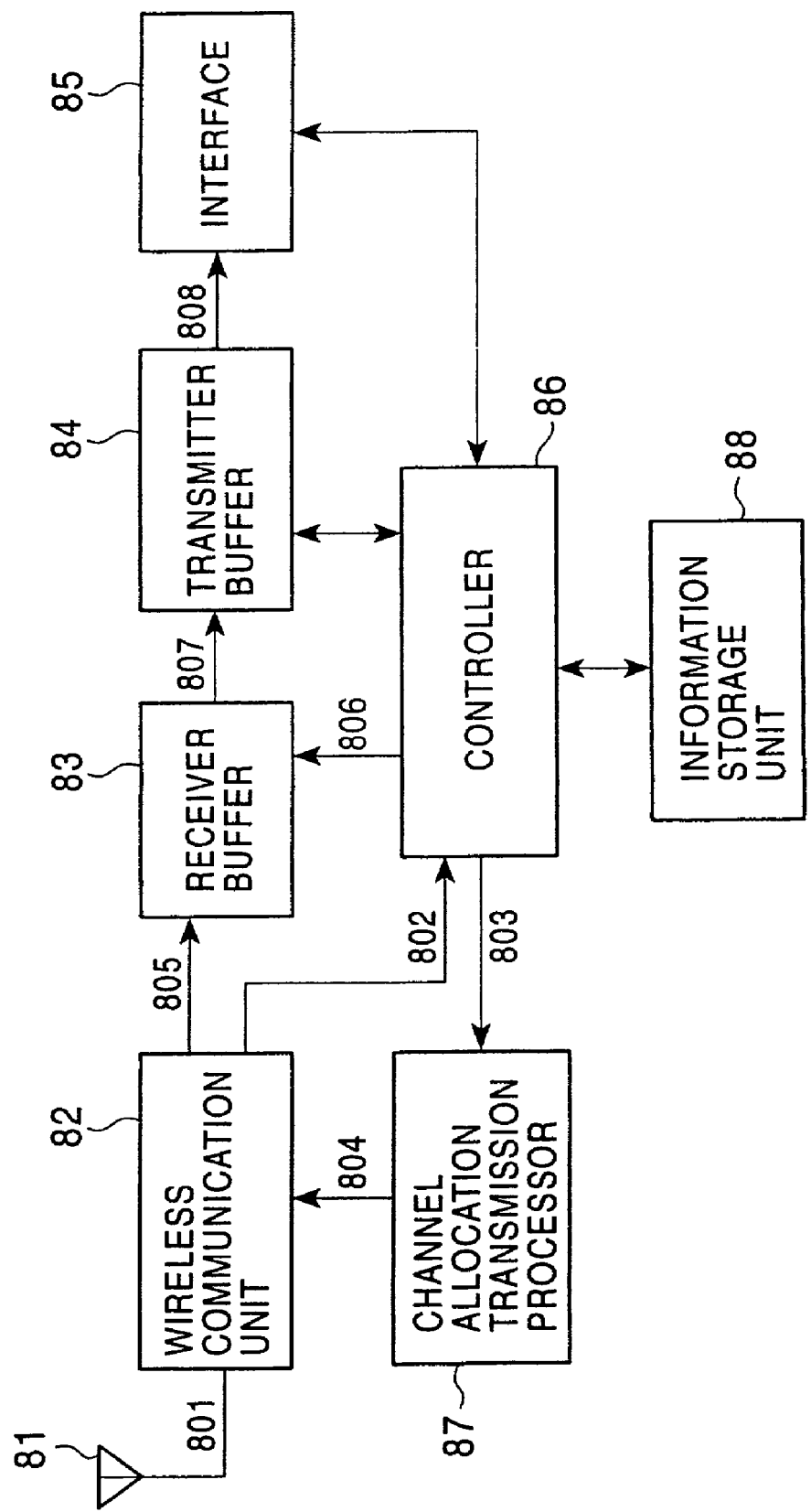
FIG. 3 is a block diagram showing an example of the configuration of a wireless receiver of the wireless communication apparatus.

FIG. 3 is a block diagram showing an example of the configuration of the wireless receiver of the wireless communication apparatus.

The wireless receiver includes an antenna 81 for receiving wireless signals and a wireless communication unit 82 for demodulating a signal 801 received by the antenna 81. A network broadcast signal 802, which is periodically transmitted from the control station, is output from the wireless communication unit 82 to a controller 86.

The controller 86 supplies channel allocation information 803, which is included in the network broadcast information 802, to an allocation transmission processor 87.

The allocation transmission processor 87 receives information 805 at a time 804 specified by the channel allocation information 803 and stores the received information 805 in a receiver buffer 83.

The controller 86 reconstructs reception information 807 in accordance with an instruction 806 in units of frame periods and sends the reception information 807 to a transmitter buffer 84.

The reception information 807 is formatted in a predetermined interface format 808 and is transferred to an external apparatus (not shown) through an interface 85.

A series of control processes is performed by instructions given by the controller 86. The controller 86 includes an information storage unit 88 for storing various transmission control programs and control information.

The wireless transmitter and the wireless receiver do not need to be independent components. Either one of the corresponding parts, such as the controllers 76 and 86, the information storage units 78 and 88, the receiver buffers 72 and 83, the transmitter buffers 73 and 84, the interfaces 71 and 85, and the antennas 75 and 81 can be shared between the wireless transmitter and the wireless receiver.

The communication apparatus functioning as the control station, which in the example shown in FIG. 1 is the communication apparatus T8, has a similar wireless transmitter and a similar wireless receiver. In this communication apparatus T8, the controllers 76 and 86 are designed to perform functions of the control station, such as transmitting network broadcast information, managing channel allocation, and allocating a channel.

Figure 4:
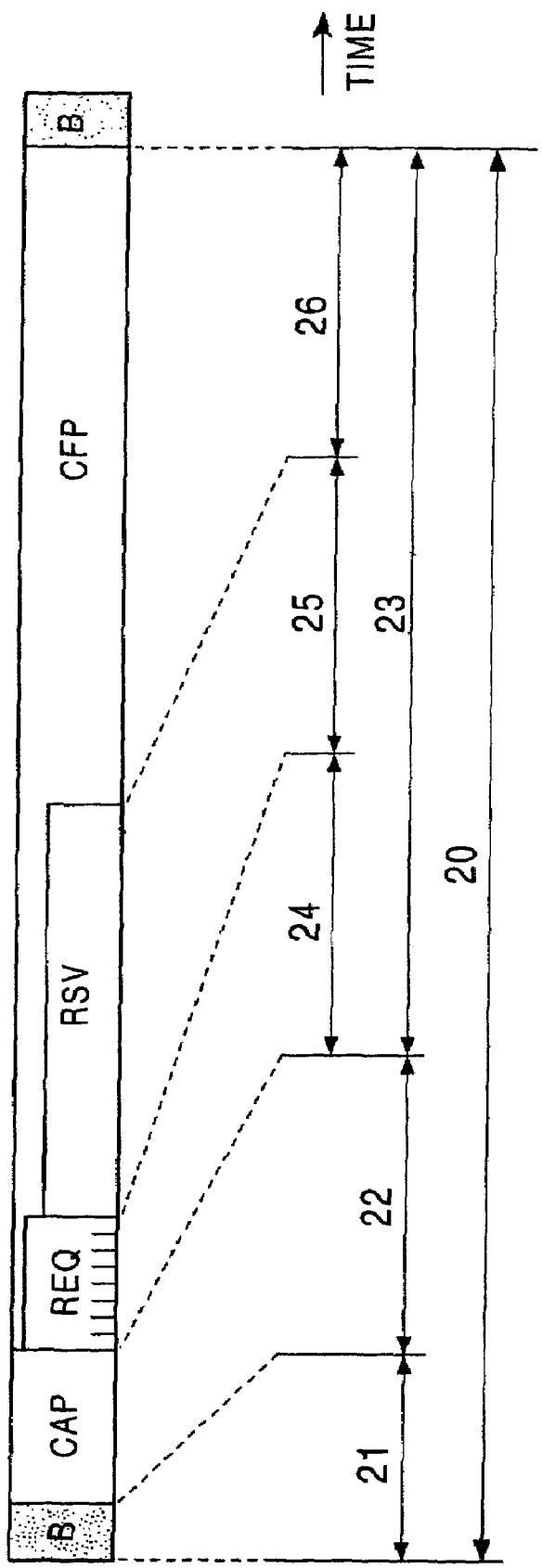
FIG. 4 illustrates an example of a frame structure set by a control station (communication apparatus T8)

FIG. 4 shows an example of a frame structure set by the control station (communication apparatus T8).

Referring to FIG. 4, a transmission frame period 20 includes a network broadcast area (B: Beacon) 21 which is broadcast from the control station over the network at the beginning of a frame; a contention access period (CAP) 22 in which processing when each communication apparatus enters the network is performed; and a contention free period (CFP) 23 in which a channel is allocated to each communication apparatus and each communication apparatus transmits information. The transmission frame period 20 ranges from the beginning of the network broadcast area (B: Beacon) 21 to the beginning of the next network broadcast area.

The contention free period 23 may include a request area (REQ) 24 in which a channel allocation request is transmitted; an allocated transmission area (RSV) 25 in which information is transmitted using an allocated channel; and an unused area 26 which is not used for transmission.

The foregoing frame structure is intended to illustrate an example, and hence the frame structure used by the wireless network system according to the present invention is not limited to this example.

First Channel Allocation Transmission Method

In the wireless communication system with the periodical frame structure, a case in which information is transmitted on an allocated channel using part of the frame will now be described. In this case, as a method for continuously performing channel allocation over a plurality of frames, a method for allocating a partial channel of the frame when transmission starts, for exclusively using the part of the frame from this point onward, and for releasing the channel when transmission is terminated will be described.

Figure 5:
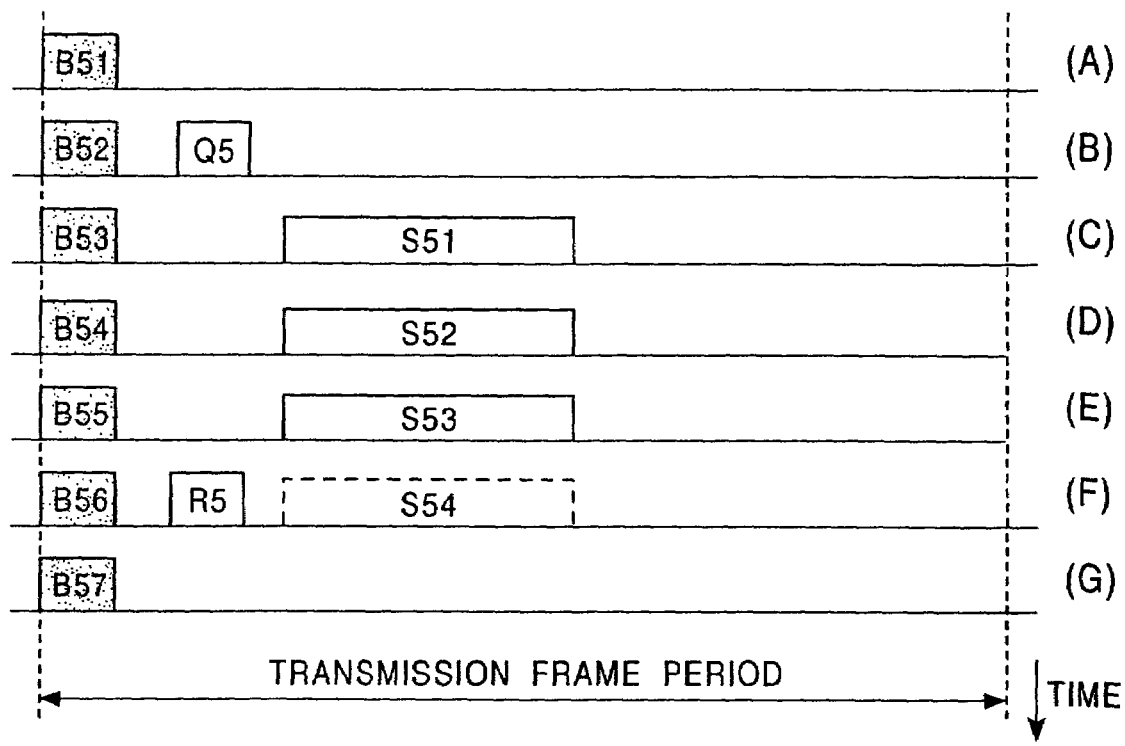
FIG. 5 illustrates channel allocation requests and a transition of allocation and transmission in a series of frames in a channel allocation transmission method according to an embodiment of the present invention.

FIG. 5 illustrates channel allocation requests and a transition of allocation and transmission in a series of frames in the channel allocation transmission method according to this embodiment of the present invention. Portions (A) to (G) of FIG. 5 correspond to a first frame to a seventh frame, respectively, of a series of frames in which the channel allocation transmission method is performed. In this channel allocation transmission method, an information sender notifies the control station of channel allocation when transmission starts and of channel release when transmission is terminated.

Referring to FIG. 5, the channel allocation transmission method will now be described.

A predetermined transmission frame period is defined by transmission of network broadcast information B51 and B52. Although a case in which the frame period is constant is shown in FIG. 5, the frame period can be variable. One frame is a period from network broadcast information (beacon) to the subsequent network broadcast information.

A wireless communication apparatus that wants to make a channel allocation request (hereinafter referred to as an information sender) transmits a continuous channel allocation request Q5 in an allocation area of the second frame (portion (B) of FIG. 5). The control station of the network receives the continuous channel allocation request Q5. If the channel can be continuously allocated, the control station specifies a transmission area to be allocated by transmitting network broadcast information B53 in the third frame (portion (C) of FIG. 5). The information sender receives the network broadcast information B53 and sends information using the allocated channel S51 in the third frame in accordance with parameters, such as transmission start time and transmission end time, of the network broadcast information B53.

From the fourth frame onward (portion (D) of FIG. 5), as long as the communication apparatus (information sender) exists in the network, the specified transmission area to be allocated is exclusively given as a transmission channel allocated to the information sender. Thus, the information sender is not required to transmit a channel allocation request in an allocation area of the subsequent frame and so forth. In other words, the control station specifies, in the network broadcast information B54 in the fourth frame (portion (D) of FIG. 5), a transmission area to be continuously allocated so that the specified transmission area to be allocated can be exclusively given to the information sender. The information sender receives the network broadcast information B54 and sends information using the allocated channel B52 in accordance with parameters of the network broadcast information B54. Similarly, the control station specifies continuous transmission using channel allocation in network broadcast information B55 of the fifth frame (portion (E) of FIG. 5). The information sender receives the network broadcast information B55 and sends information using the allocated channel S53 in accordance with parameters of the network broadcast information B55. By transmitting the information in S53, transmission of information to be transmitted is completed. Referring to FIG. 5, the information transmission slots (S51 to S53) assigned by the control station are illustrated at the same position in the corresponding frames. Alternatively, the slots S51 to S53 can be located at different positions in one frame to another.

In the sixth frame (portion (F) of FIG. 5), the control station specifies continuous transmission using channel allocation in network broadcast information B56. In contrast, since the information transmission is terminated, the information sender transmits a channel release request R5 in an allocation area of the sixth frame (portion (F) of FIG. 5). When the control station of the network receives the channel release request R5, the control station transmits in the seventh frame (portion (G) of FIG. 5) network broadcast information B57 which specifies no transmission area to be allocated. Accordingly, the channel allocation transmission is terminated. The released channel can be used for other communication purposes.

In FIG. 5, a case has been described in which the control station, after receiving the continuous channel allocation request Q5, specifies a transmission area to be allocated (which is to be used by a transmitting terminal to transmit information) in each frame by sending the network broadcast information B53, B54, and B55. Alternatively, after receiving the channel allocation request Q5, the control station can send the network broadcast information B53 in which channel allocation information for allocating a channel till three frames after the current frame can be transmitted. In this case, the same information as that in B53 is transmitted in B54 and B55. Accordingly, even if one of the network broadcast information B53, B54, and B55 is not received, information can be normally decoded.

In FIG. 5, the continuous chancel allocation request Q5 received by the control station is a channel allocation request for allocating a channel in a frame immediately after the current frame. However, the continuous channel allocation request Q5 can be a channel allocation request for allocating a channel in a few frames after the current frame in which the continuous channel allocation request Q5 is transmitted. For example, it is assumed that the continuous channel allocation request Q5 is a request for allocating a channel from ten frames after the current frame to twenty frames after the current frame. In this case, network broadcast information is transmitted ten times from a frame in which the continuous channel allocation request Q5 is received to a frame in which data is actually transmitted. Alternatively, the continuous channel allocation information can be divided so that it can be transmitted through the network broadcast information that is transmitted ten times. By receiving the network broadcast information ten times, a terminal can recognize a transmission channel from ten frames after the current frame in which data is actually transmitted to twenty frames after the current frame.

As in the foregoing embodiment, instead of being divided into pieces, channel allocation information can be repeatedly transmitted. If a terminal receives any one of network broadcast information that is transmitted ten times, the terminal can be allowed to recognize a transmission channel.

Sequence of Transmission and Allocation Operation of Information Sender

Figure 6:
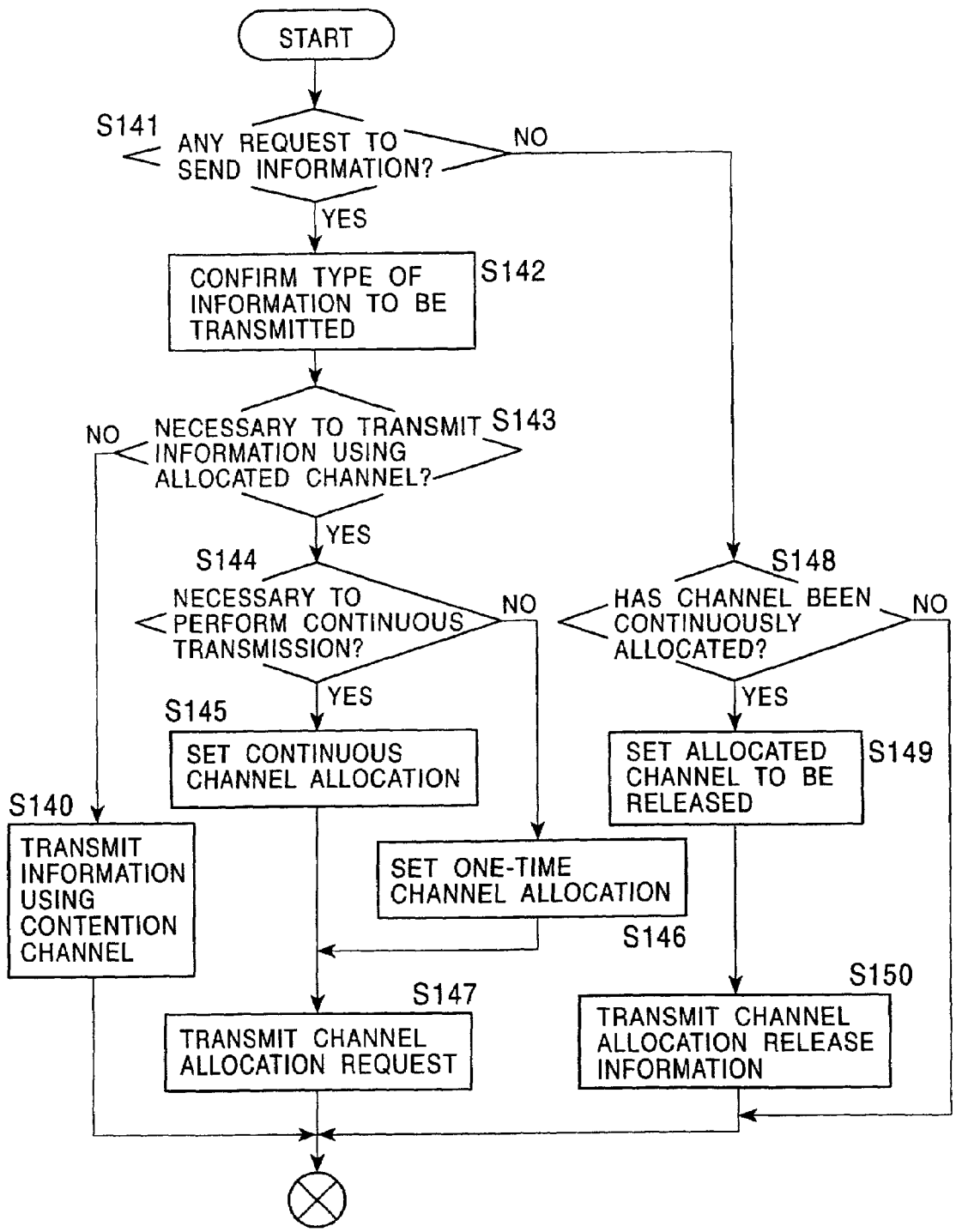
FIG. 6 is a flowchart showing a transmission allocation operation sequence by an information sender.

The operation of the information sender in the channel allocation transmission method will now be described. FIG. 6 illustrates a sequence of transmitting information using an allocated channel by the information sender.

It is determined whether or not a request to send information which is to be wirelessly transmitted has reached the interface of the communication apparatus (step S141).

If the determination is affirmative, the type of information to be transmitted is confirmed (step S142).

It is determined whether or not it is necessary to transmit information using an allocated channel (step S143). If the determination is affirmative, it is determined whether or not it is necessary to perform continuous transmission as streaming transmission (step S144). For example, when the application to be transmitted is image information or music data, it is determined that continuous transmission is necessary.

If continuous transmission is to be performed, continuous channel allocation is set (step S145). If transient transmission is to be performed, one-time channel allocation is set (step S146). In both cases, channel allocation request information is transmitted using a specified allocation area of the frame period to the communication apparatus functioning as the control station (step S147).

If it is determined in step S143 that it is unnecessary to transmit information using an allocated channel, information is appropriately transmitted using an unallocated contention access period in accordance with a predetermined access control method (carrier sense multiple access with collision advance (CSMA/CA)) (step S140).

If it is determined in step S141 that there is no information to be wirelessly transmitted, it is determined whether or not a channel has been continuously allocated (step S148). If a channel has been continuously allocated, the allocated channel is set to be released (step S149). Channel allocation release information is transmitted using a specified allocation area in the frame period to the communication apparatus functioning as the control station (step S150).

Operation of Control Station

Figure 7:
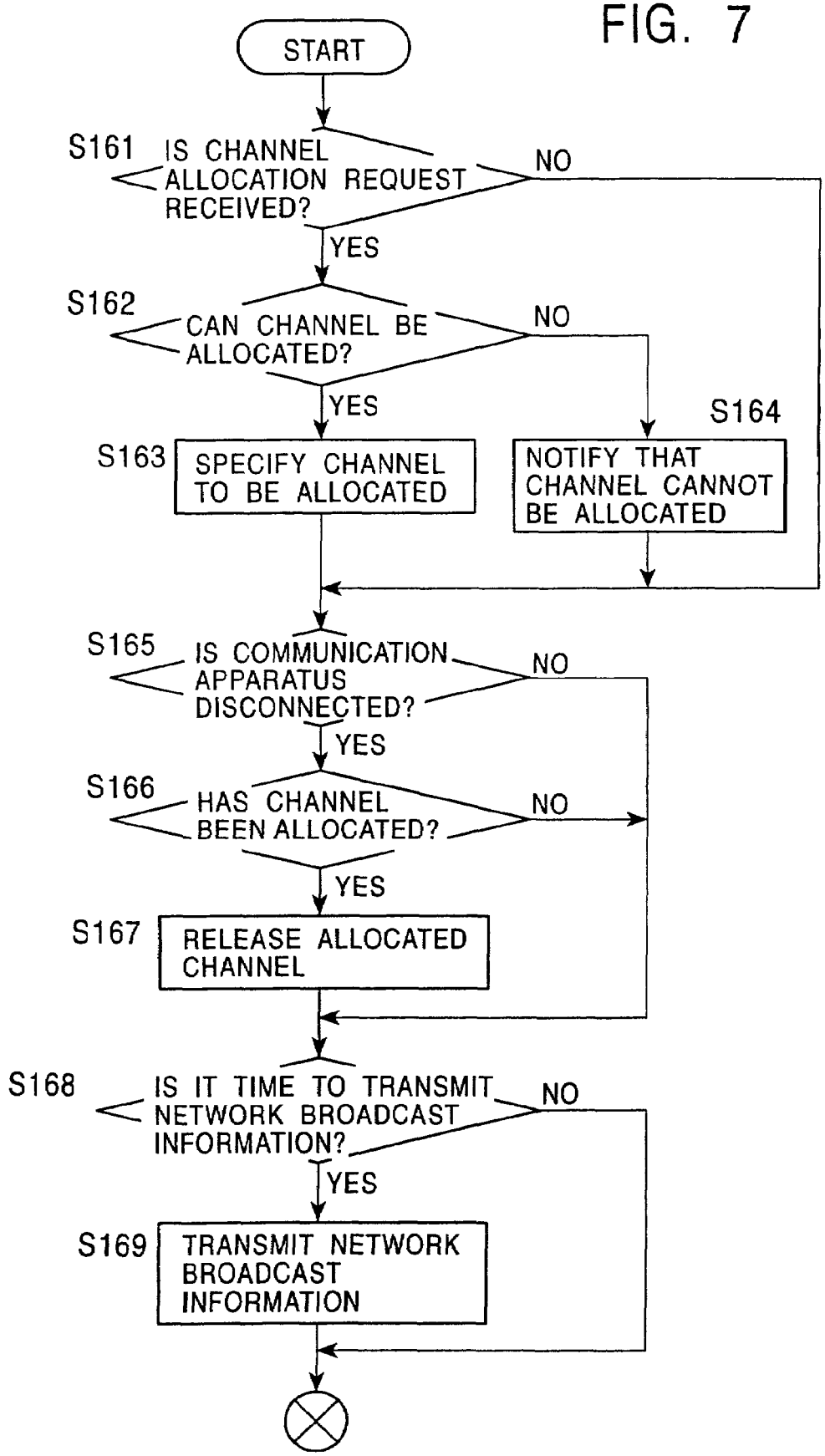
FIG. 7 is a flowchart showing the operation of the control station in the channel allocation transmission method.

The operation of the control station in the channel allocation transmission method will now be described. FIG. 7 illustrates the operation of the control station in the channel allocation transmission method.

The control station determines whether or not the control station has received a channel allocation request wirelessly transmitted by the communication apparatus in the network (step S161).

If the determination is affirmative, the control station determines whether or not the channel can be allocated (step S162). If the channel can be allocated, the control station specifies a transmission start time and a transmission end time within one frame, thus specifying a transmission channel to be allocated (step S163). The control station registers the channel as network broadcast information and proceeds to step S165, which will be described below. In contrast, if the channel cannot be allocated, the control station sets a notice indicating that the channel cannot be allocated and registers the notice as network broadcast information (step S164). Subsequently, the control station proceeds to step S165, which will be described below.

If the control station has received no channel allocation request in step S161, the control station proceeds to step S165.

The control station determines whether or not the communication apparatus, belonging to the network, is disconnected from the network (step S165). If the disconnection of the communication apparatus is detected, it is determined whether or not a channel has been allocated to the disconnected communication apparatus (step S166). If the determination is affirmative, the control station releases the allocated transmission channel (step S167). In contrast, if the communication apparatus is not disconnected or no channel is allocated to the communication apparatus, the control station proceeds to step S168. Processing from step S165 to step S167 can be performed for all the communication apparatuses belonging to the network.

The control station determines whether or not the time is reached in the predetermined frame period to transmit the network broadcast information (step S168). If the time is reached, the control station transmits the network broadcast information (step S169). In contrast, if the time to transmit the network broadcast information is not reached, the control station exits from the processing.

Accordingly, the operation sequence of the control station is terminated.

Operation of Information Sender After Making Channel Allocation Request

Figure 8:
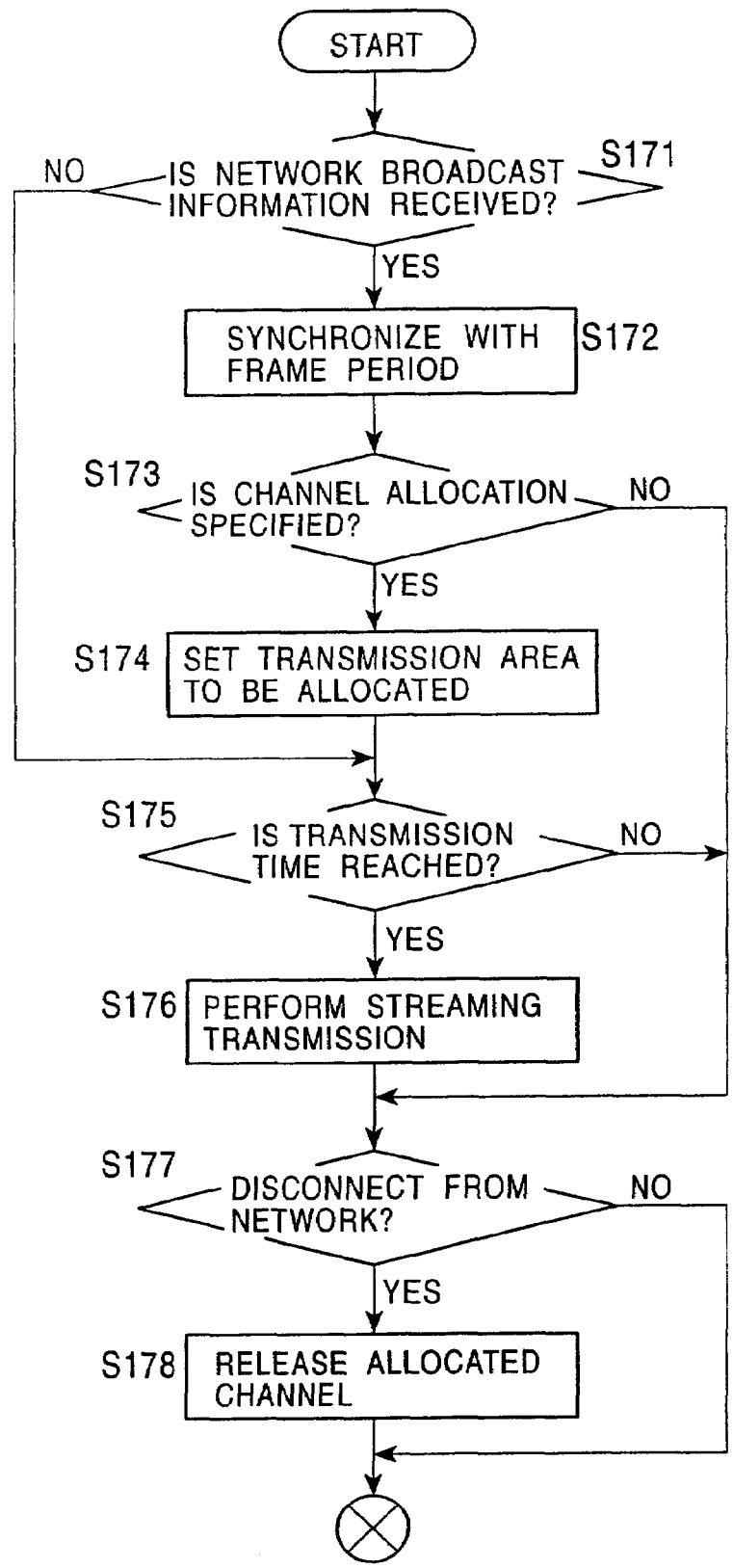
FIG. 8 is a flowchart showing the operation of the information sender after making a channel allocation request.

The operation of the information sender after making the channel allocation request in the channel allocation transmission method will now be described. FIG. 8 is a flowchart showing the operation of the information sender after making the channel allocation request.

The information sender determines whether or not the information sender has received the network broadcast information wirelessly sent by the control station of the network (step S171).

If the determination is affirmative, the information sender synchronizes with the frame period (step S172) and determines whether or not transmission using an allocated channel is specified in the frame broadcast information (step S173). If the determination is affirmative, the transmission area to be allocated is set (step S174). In contrast, if transmission using an allocated channel is not specified, the information sender proceeds to step S177.

If the channel has been continuously allocated, the information sender that cannot receive the network broadcast information in the frame determines whether or not the transmission time specified by the control station is reached (step S175). If the specified transmission time is reached, the information sender performs streaming transmission of information using the predetermined allocated channel (step S176). In contrast, if the specified transmission time is not reached, the information sender proceeds to step S177, which will be described below.

The information sender determines whether or not it is necessary to disconnect from the network, such as when the information sender cannot establish a connection with the control station over a plurality of frame periods or when no power is supplied to the information sender (communication apparatus) (step S177). If the information sender determines that it is necessary to disconnect from the network, the information sender performs processing to release the allocated transmission channel (step S178), and the streaming transmission is terminated.

The information sender operates so as to periodically repeat the foregoing sequence.

Operation of Information Receiver

Figure 9:
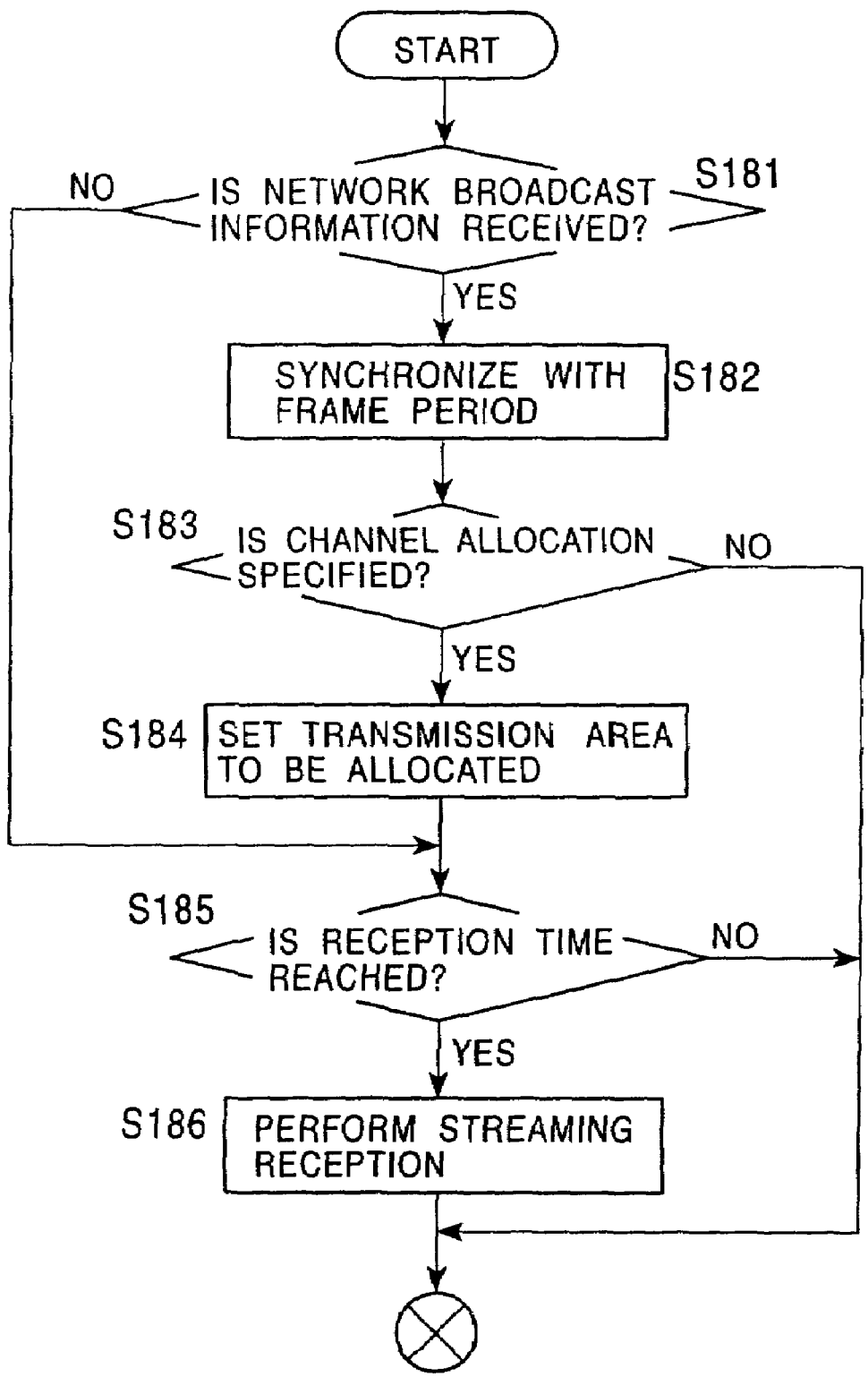
FIG. 9 is a flowchart showing the periodical operation of an information receiver.

The operation of the information receiver, which is the communication apparatus at the destination for receiving information transmitted from the information sender, in the channel allocation transmission method will now be described. FIG. 9 is a flowchart showing the periodical operation of the information receiver.

The information receiver determines whether or not it has received network broadcast information wirelessly transmitted from the control station of the network (step S181).

If the determination is affirmative, the information receiver synchronizes with the frame period (step S182) and determines from allocation information included in the network broadcast information whether or not transmission using a channel allocated to the information sender is specified (step S183). If the determination is affirmative, the transmission area to be allocated is set (step S184). In contrast, if no channel allocation transmission is specified, the information receiver exits from the processing.

After setting the transmission area to be allocated, when a channel is continuously allocated, the information receiver that cannot receive network broadcast information in the frame determines whether or not the specified reception time to receive information using the allocated channel is reached (step S185). If the specified reception time is reached, the information receiver performs streaming reception using the predetermined allocated channel (step S186). In contrast, if the time is not reached, the information receiver exits from the processing.

The information receiver operates so as to periodically repeat the foregoing sequence.

Advantage of First Channel Allocation Transmission Method

According to the foregoing channel allocation transmission method, when information is transmitted using an allocated channel, a transmission channel is continuously allocated over a plurality of frames. Accordingly, it becomes unnecessary to allocate a channel in each frame period, thus simplifying the processing sequence. When transmission using an allocated channel is terminated, the allocated channel is released. Thus, the channel that has been allocated to the communication apparatus to send information can be immediately released when transmission is terminated, and hence the released channel becomes available for the other communication apparatuses to perform wireless transmission. This contributes to achieving efficient network resource utilization.

Second Channel Allocation Transmission Method

As a second method for continuously allocating a channel over a plurality of frames, the following method will now be described. In this method, the information sender sets a termination time limit when transmission starts, and channel allocation is performed. In order to continue transmission using the allocated channel, the information sender again makes a channel allocation request before the termination time limit expires. Hereinafter a case in which the information sender determines the number of continuous frames over which a channel is allocated is described. Alternatively, the control station may take into consideration the amount of information, such as the number of bytes, requested for transmission by the information sender and may determine the number of continuous frames in which a channel is allocated.

Figure 10:
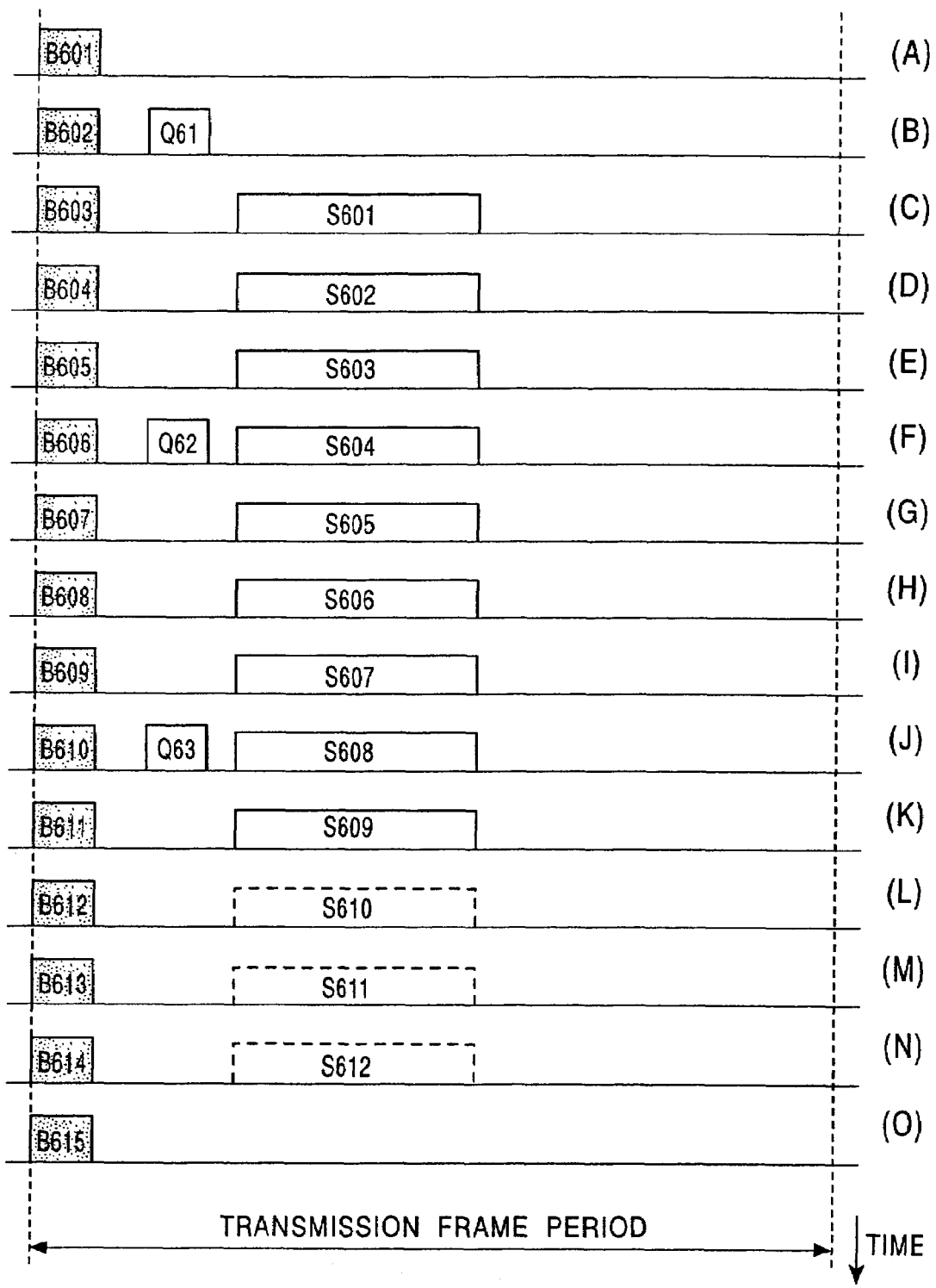
FIG. 10 illustrates channel allocation requests and a transition of allocation and transmission in a series of frames in the channel allocation transmission method.

FIG. 10 illustrates channel allocation requests and a transition of allocation and transmission in a series of frames in the channel allocation transmission method. Portions (A) to (O) of FIG. 10 correspond to a first frame to a fifteenth frame, respectively, of a series of frames in which the channel allocation transmission method is performed. With reference to FIG. 10, the channel allocation transmission method will now be described.

A predetermined transmission frame period is determined by transmitting network broadcast information B601 and B602.

The wireless communication apparatus, i.e., the information sender, which belongs to the wireless network and which wants to make a channel allocation request transmits a channel allocation request Q61 in an allocation area of the second frame (portion (B) of FIG. 10). The channel allocation request Q61 requests a channel to be allocated continuously over a predetermined period of time or a predetermined number of frames. In order to simplify the description, a case in which the information sender makes a channel allocation request to allocate a channel over four frames is described. However, the embodiment of the method is not limited to four frames. A channel can be allocated over an arbitrary number of frames.

The control station of the wireless network receives the channel allocation request Q61. The control station checks the status of the wireless network resource and determines whether or not a channel can be continuously allocated. If the determination is affirmative, the control station specifies a transmission area to be allocated by transmitting network broadcast information B603 in the third frame (portion (C) of FIG. 10). In the description, it is regarded that a channel can be allocated. The information sender receives the network broadcast information B603 and sends information using the allocated channel B601 in accordance with parameters (transmission start time and end time) of the network broadcast information B603.

In each of the fourth frame (portion (D) of FIG. 10) to the sixth frame (portion (F) of FIG. 10), an area corresponding to the allocated transmission area S601 is exclusively allocated to reserved transmission by the information sender. Thus, the information sender does not make a channel allocation request in allocation areas of the third frame (portion (C) of FIG. 10) to the fifth frame (portion (E) of FIG. 10). In other words, the control station specifies that, in network broadcast information B604 in the fourth frame (portion (D) of FIG. 10), a transmission area to be continuously allocated be exclusively allocated to reserved transmission by the information sender. The information sender receives the network broadcast information B604 and sends information using the allocated channel S602 in accordance with parameters of the network broadcast information B604.

Similarly, the control station specifies continuous transmission using the allocated channel in network broadcast information B605 in the fifth frame (portion (E) of FIG. 10). The information sender receives the network broadcast information B605 and sends information using the allocated channel S603 in accordance with parameters of the network broadcast information B605.

Similarly, the control station specifies continuous transmission using the allocated channel in network broadcast information B606 in the sixth frame (portion (F) of FIG. 10). The information sender receives the network broadcast information B606 and sends information using the allocated channel S604 in accordance with parameters of the network broadcast information B606. At this time, the continuous allocation over four frames is completed. If it is necessary to continuously send information from the subsequent frame onward, the information sender is required to send a continuous channel allocation request in an allocation area of the sixth frame (portion (F) of FIG. 10). In this example, it is regarded that the information sender is required to continuously send information from the subsequent frame onward and that the information sender transmits a continuous channel allocation request Q62.

The control station checks the status of the wireless network resource and determines whether or not a channel can be continuously allocated. If the determination is affirmative, the control station specifies a transmission area to be allocated by transmitting network broadcast information B607 in the seventh frame (portion (G) of FIG. 10). In the description, it is regarded that a channel can be allocated. The information sender receives the network broadcast information B607 and transmits information using the allocated channel S605 in accordance with parameters (transmission start time and end time) of the network broadcast information B607.

In each of the eighth frame (portion (H) of FIG. 10) to the tenth frame (portion (J) of FIG. 10), an area corresponding to the allocated transmission area S605 is exclusively allocated to reserved transmission by the information sender. Thus, the information sender does not send a channel allocation request in allocation areas of the seventh frame (portion (G) of FIG. 10) to the ninth frame (portion (I) of FIG. 10). In other words, the control station specifies, in network broadcast information B608 in the eighth frame (portion (H) of FIG. 10), that a transmission area to be continuously allocated be exclusively allocated to reserved transmission by the information sender. The information sender receives the network broadcast information B608 and sends information using the allocated channel S606 in accordance with parameters of the network broadcast information B608.

Similarly, the control station specifies continuous transmission using the allocated channel in network broadcast information B609 in the ninth frame (portion (I) of FIG. 10).

The information sender receives the network broadcast information B609 and sends information using the allocated channel S607 in accordance with parameters of the network broadcast information B609.

Similarly, the control station specifies continuous transmission using the allocated channel in network broadcast information B610 in the tenth frame (portion (J) of FIG. 10). The information sender receives the network broadcast information B610 and sends information using the allocated channel S608 in accordance with parameters of the network broadcast information B610. At this time, the continuous allocation over four frames, starting from the seventh transmission frame, is terminated. If it is necessary to continuously send information from the subsequent frame onward, the information sender is required to send a continuous channel allocation request in an allocation area of the tenth frame (portion (J) of FIG. 10). In this example, it is regarded that the information sender is required to continuously send information from the subsequent frame onward and that the information sender transmits a continuous channel allocation request Q63.

The control station receives the continuous channel allocation request Q63. If a channel can be continuously allocated, the control station transmits network broadcast information B611 in the eleventh frame (portion (K) of FIG. 10) and specifies a transmission area to be allocated.

The information sender receives the network broadcast information B611 and sends information using the allocated channel S609 in accordance with parameters (transmission start time and end time) of the network broadcast information B611.

The control station specifies continuous transmission using the allocated channel (S610) in network broadcast information B612 in the twelfth frame (portion (L) of FIG. 10). In contrast, if the information transmission by the information sender is terminated, the information transmission is not performed. In this example, it is regarded that the information transmission by the information sender is terminated and that the specified transmission using the allocated channel is not performed.

Similarly, network broadcast information B613 and B614 specify continuous transmission (S611 and S612) in the thirteenth frame (portion (M) of FIG. 10) and the fourteenth frame (portion (N) of FIG. 10). Since the information transmission is terminated, the information sender does not perform the information transmission S611 and S612.

In the fifteenth frame (portion (O) of FIG. 10), the control station sends network broadcast information B615 in which no transmission area to be allocated is specified. Accordingly, transmission using the allocated channel is terminated.

Sequence of Transmission and Allocation Operation of Information Sender

Figure 11:
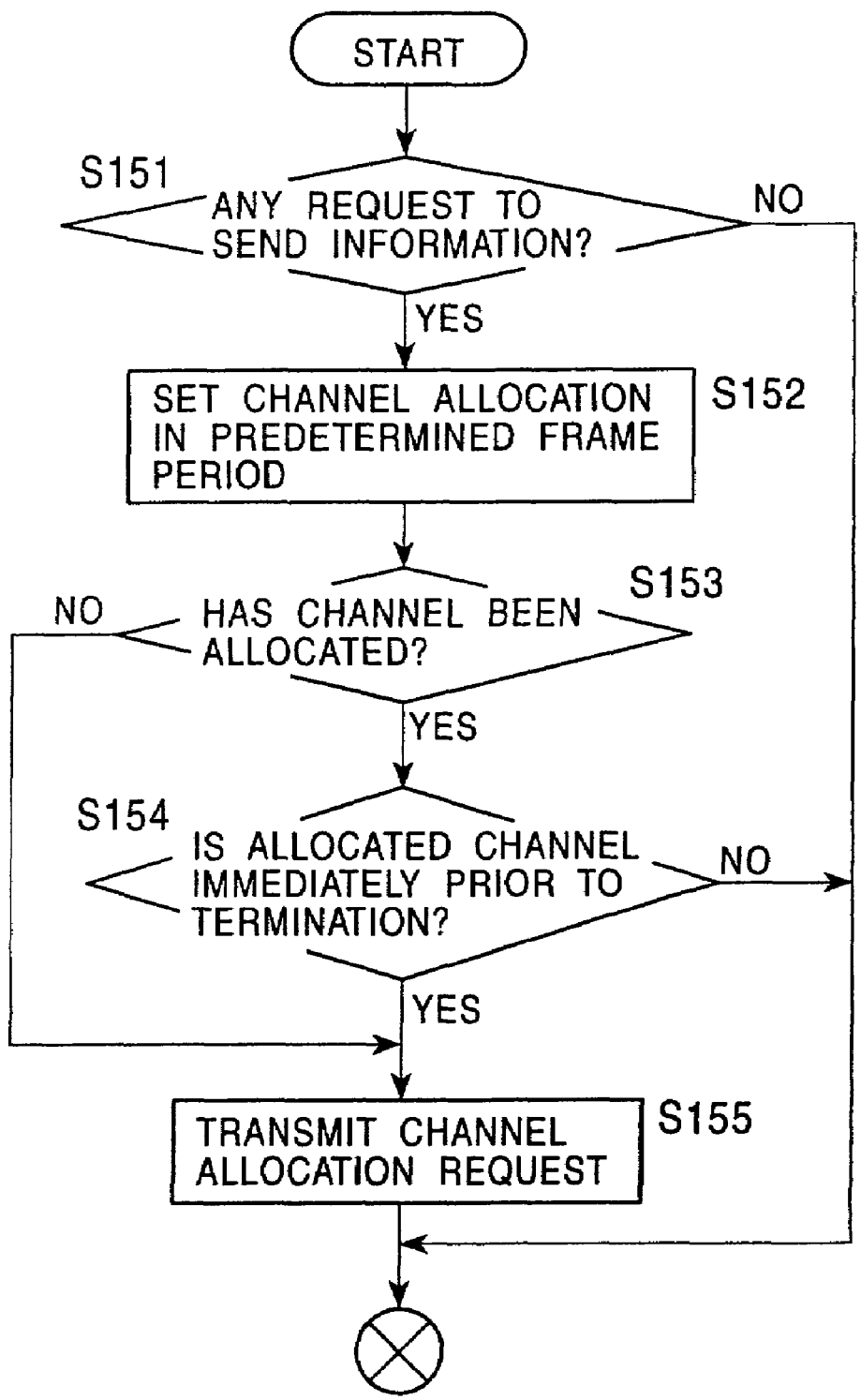
FIG. 11 is a flowchart showing a transmission allocation operation sequence by the information sender.

The operation of the information sender in the channel allocation transmission method will now be described. FIG. 11 illustrates a sequence of transmitting information using an allocated channel by the information sender.

It is determined whether or not a request to send information which is to be wirelessly transmitted has reached the interface of the information sender (step S151).

If the determination is affirmative, a parameter is set so that a channel can be allocated over a predetermined period (step S152). Subsequently, it is determined whether or not a channel has been allocated (step S153). If the determination is negative, the sequence proceeds to step S155.

If a channel has been allocated, it is determined whether the allocation is immediately before termination, that is, whether the allocated channel is in the last frame of a predetermined plurality of frames over which the channel has been allocated beforehand (step S154). If the determination is affirmative, channel allocation request information is sent to the communication apparatus functioning as the control station using a specified allocation area in the frame period (step S155).

If it is determined in step S154 that the channel allocation is not immediately before termination, it is unnecessary to send a request signal. Thus, the processing is terminated.

If it is determined in step S151 that there is no information to be wirelessly transmitted, the processing is terminated.

If necessary, the releasing sequence in the first channel allocation transmission method may be performed.

Advantages of Second Channel Allocation Transmission Method

According to the second channel allocation transmission method, a predetermined termination time is set when information is transmitted using an allocated channel. The transmission channel can be continuously allocated over a plurality of frames, and hence it becomes unnecessary to perform channel allocation processing in each frame period. When the information sender is no longer in the network, the allocated area can be released without performing releasing processing. The released area becomes available for the other communication apparatuses to perform wireless transmission. This contributes to achieving efficient network resource utilization.

In order to continuously perform streaming transmission, a channel is again allocated in which a predetermined termination time is preset. Accordingly, channel allocation can be repeatedly performed until the end of streaming transmission, and hence streaming transmission can be efficiently performed.

Operation of Control Station, Operation of Information Sender After Making Channel Allocation Request, and Operation of Information Receiver The operation of the control station, the operation of the information sender after making a channel allocation request, and the operation of the information receiver in the second channel allocation transmission method are basically the same as those in the first channel allocation transmission method.

Examples of Configuration of Channel Allocation Request Information, Network Broadcast Information, and Channel Allocation Release Information Examples of the configuration of channel allocation request information, network broadcast information, and channel allocation release information used in the first channel allocation transmission method or the second channel allocation transmission method will now be described.

Figure 12:
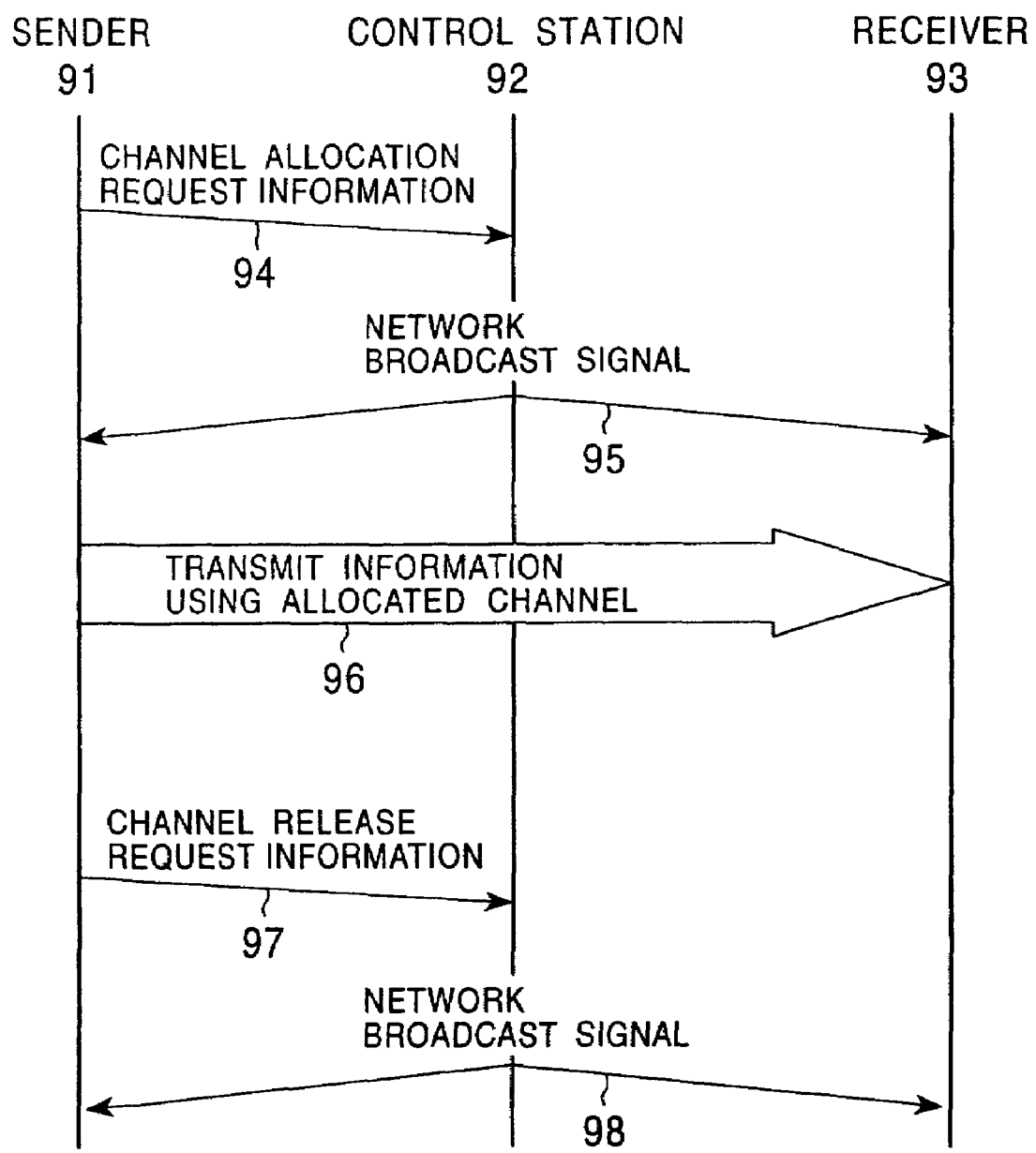
FIG. 12 illustrates an example of a channel allocation sequence corresponding to part of the channel allocation transmission method.

FIG. 12 shows an example of a channel allocation sequence corresponding to part of the first and second channel allocation transmission methods.

An information sender 91 sends channel allocation request information 94 to a control station 92. In response to the request 94, the control station 92 broadcasts channel allocation information as a network broadcast signal 95 over the network. The network broadcast information 95 including the channel allocation information reaches the information sender 91 and an information receiver 93, which is the destination of the information.

Being notified of the fact that a channel is allocated, the information sender 91 and the information receiver 93 transmit information using the allocated channel 96 when the allocated transmission channel, which is specified by the network broadcast signal 95, is reached.

When the transmission using the allocated channel 96 is terminated, the information sender 91 sends channel release request information 97 to the control station 92.

The control station 92 receives the channel release request information 97 and, in accordance with the channel release request information 97, transmits a channel release notice as a network broadcast signal 98 to communication apparatuses (including the information sender 91 and the information sender 93) included in the network.

In the second channel allocation transmission method, the channel release request information 97 and the network broadcast signal 98 including the channel release notice are not used.

Figure 13:
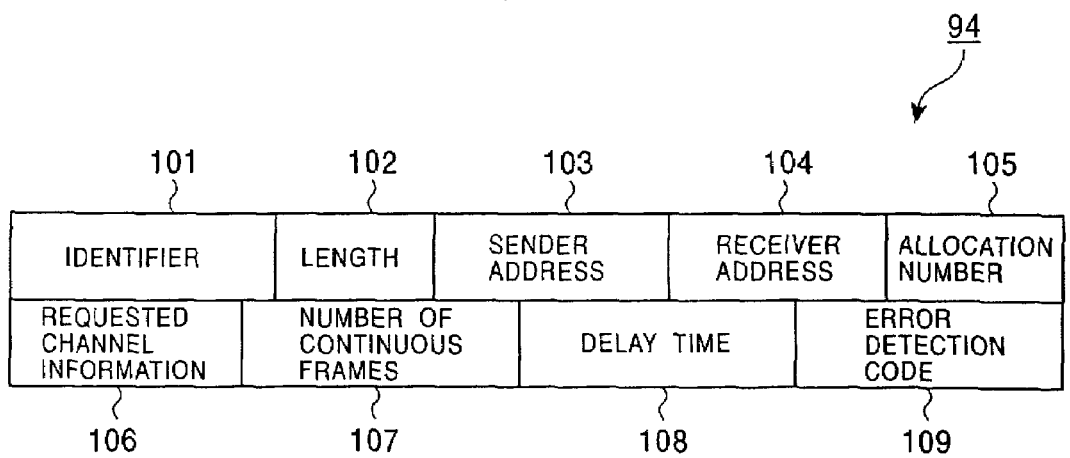
FIG. 13 illustrates an example of the structure of channel allocation request information.

An example of the configuration of the channel allocation request information 94 will now be described. FIG. 13 shows an example of the configuration the channel allocation request information 94 shown in FIG. 12.

The channel allocation request information 94 is used when the apparatus that wants to request channel allocation makes a channel allocation request to the apparatus functioning as the control station of the network.

The channel allocation request information 94 includes an identifier 101 representing that the information is a channel allocation request; an information length 102 representing the length of the information to be described; to be described; an address 103 of the sender (communication apparatus) of the information; an address 104 of the receiver (communication apparatus) of the information; an allocation number 105 for individually distinguishing a channel allocation request; requested channel information 106 representing the bandwidth of a channel in accordance with the amount of information to be transmitted; continuous frame number information 107 representing the number of continuous frames over which a channel is continuously allocated; delay time 108 allowed to transmission using channel allocation; and an error detection code 109.

Instead of providing the continuous frame number information 107, the amount of information to be sent can be transmitted to the control station. In accordance with the amount of information to be sent, the control station can compute the number of continuous frames. The computed number can be sent as a continuous allocation frame number 136 in the network broadcast signal 95.

Figure 14:
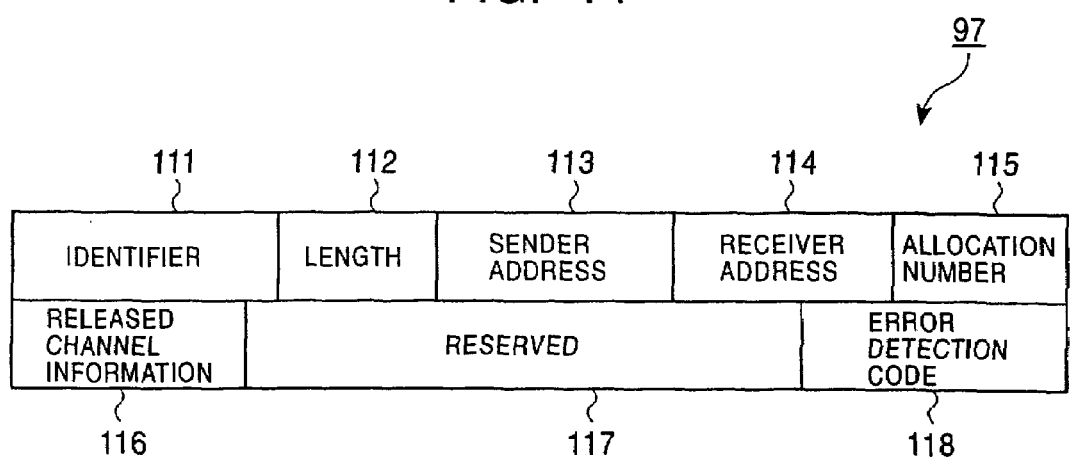
FIG. 14 illustrates an example of the structure of channel allocation release information.

An example of the configuration of the channel allocation release information 97 will now be described. FIG. 14 illustrates an example of the configuration of the channel allocation release information 97. In order to release the allocated channel, the information 97 is used when the apparatus that has requested channel allocation makes a channel release request to the apparatus functioning as the control station of the network.

In this example, the channel allocation release information 97 includes an identifier 111 representing that the information is a request for releasing the allocated channel; an information length 112 representing the length of the information to be described; an address 113 of the sender (communication apparatus) of the information; an address 114 of the receiver (communication apparatus) of the information; an allocation number 115 for individually distinguishing a channel allocation request to be released; released channel information 116 representing the bandwidth of a channel to be released; a reserved area 117 which is provided if necessary; and an error detection code 118.

Figure 15:
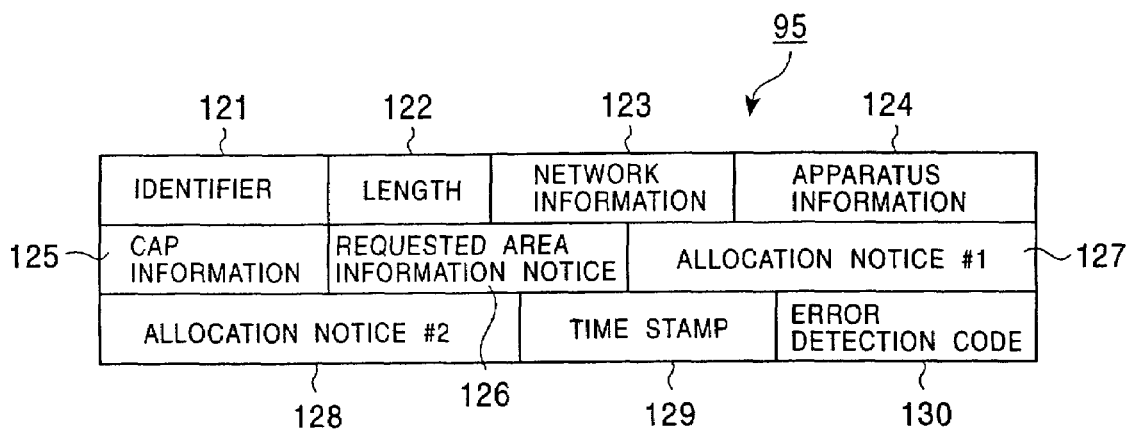
FIG. 15 illustrates an example of the structure of network broadcast information.

An example of the configuration of the network broadcast signal 95 including the allocation notice will now be described. FIG. 15 shows an example of the configuration of the network broadcast signal 95. The network broadcast signal 95 is periodically broadcast by the control station and is used to distinguish a frame period. In the network broadcast signal 95, a parameter of channel allocation in a frame period is described. In accordance with the parameter, communication apparatuses in the network control information transmission.

In this example, the network broadcast signal 95 includes an identifier 121 representing that the signal is network broadcast information; an information length 122 representing the length of the information to be described; information 123 for distinguishing the network; information 124 about apparatuses connected to the network; information 125 representing the position of a contention access period in the frame period; an information notice 126 indicating the position and allocation of a request area in the frame period; first allocation notice information 127 provided if necessary; second allocation notice information 128; information (time stamp) 129 representing a time at which the frame is transmitted; and an error detection code 130. Although two pieces of allocation notice information are included in this example, the number of pieces of allocation notice information is not limited to two and can be an arbitrary number.

Figure 16:
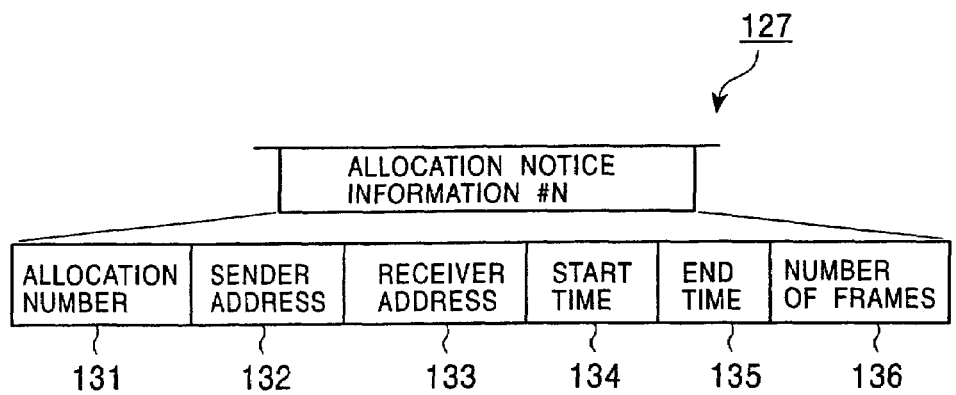
FIG. 16 illustrates an example of the structure of allocation notice information in the network broadcast information.
Figure 17:
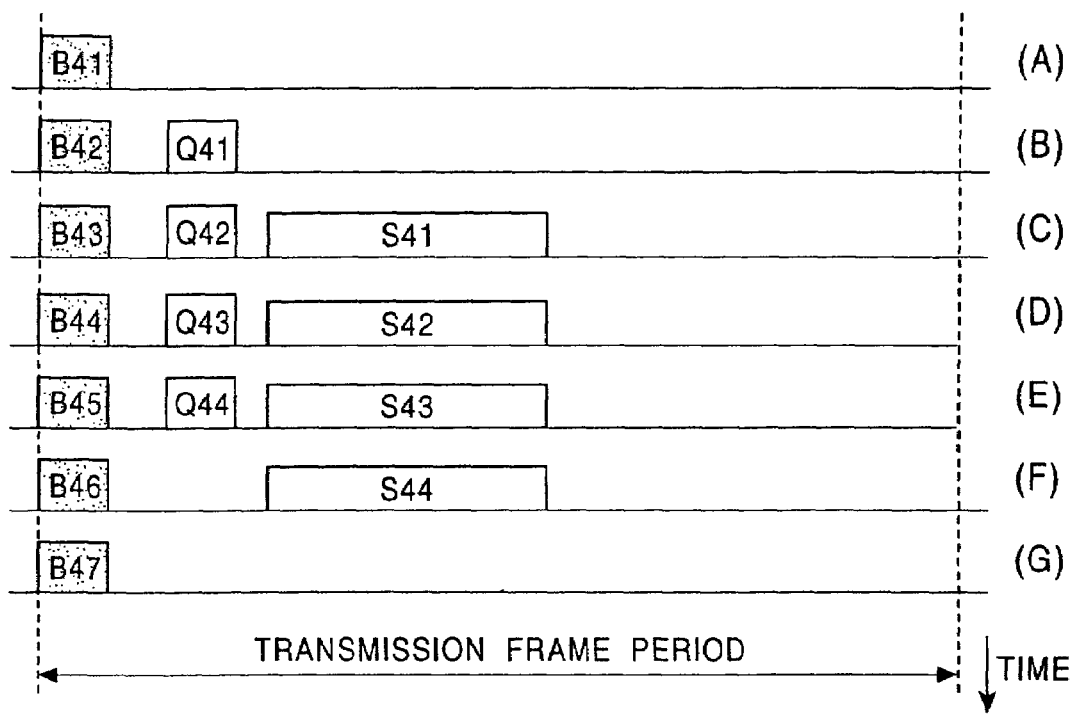
FIG. 17 illustrates examples of frames when continuous channel allocation is performed by a known method.
Figure 18:
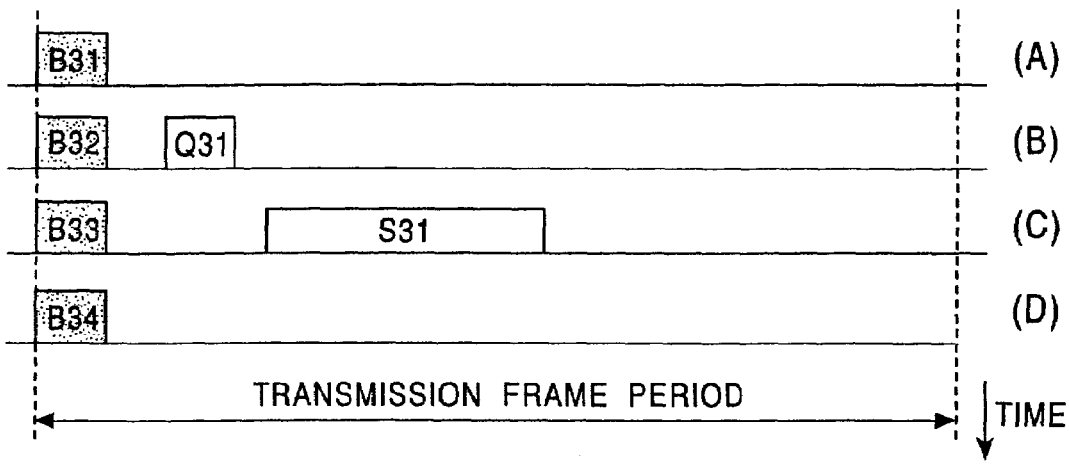
FIG. 18 illustrates an example of a case in which channel allocation is performed in only one frame by a known method.

An example of the configuration of the allocation notice information will now be described. FIG. 16 shows an example of the configuration of the first allocation notice information 127 in the network broadcast signal 95. The second allocation notice information 128 has the similar configuration.

The allocation notice information 127 includes an allocation number 131 for notification; an address 132 of the sender of the information; an address 133 of the receiver of the information; a time 134 at which transmission using an allocated channel can start; and a time 135 at which transmission must be terminated. Also, a continuous allocation frame number 136 representing the number of frames allocated subsequent to the current frame is provided.

Advantages of Channel Allocation Request Information, Network Broadcast Information, and Channel Allocation Release Information By including information bits representing continuous allocation in the channel allocation information, one-time channel allocation and continuous channel allocation can be discriminated. Accordingly, the most suitable channel allocation method can be selected depending on the information to be transmitted.

By including information representing the number of frames in the channel allocation information, transmission using an allocated channel over an arbitrary period of time can be performed. During the arbitrary period of time, no channel allocation processing is necessary. Accordingly, unnecessary allocation processing can be simplified.

What is claimed is:

1. A wireless communication method, comprising:
   providing a first wireless communication apparatus and a second wireless communication apparatus each operable to carry out wireless communication over a network using predetermined frame periods set by network broadcast information;
   periodically transmitting, from the second wireless communication apparatus, the network broadcast information over the network;
   transmitting a respective channel allocation request from the first wireless communication apparatus to the second wireless communication apparatus using a portion of one of the predetermined frame periods;

allocating, at the second wireless communication apparatus, a particular channel to the first wireless communication apparatus for respective parts of each one of a plurality of consecutive frame periods in response to receiving the respective channel allocation request from the first wireless communication apparatus;

determining, at the second wireless communication apparatus, whether the first wireless communication apparatus has detached from the network after having transmitted the respective channel allocation request;

releasing the allocated channel if the second wireless communication apparatus determines that the first wireless communication apparatus is detached from the network;

including at the second wireless communication apparatus, channel allocation information within a subsequent one of the periodically transmitted network broadcast information if the second wireless communication apparatus determines that the first wireless communication apparatus is not detached from the network, the channel allocation information indicating that the particular channel is allocated to the first wireless communication apparatus for the respective parts of the plurality of consecutive frame periods; and carrying out wireless communication, using the first wireless communication apparatus over the allocated channel, in response to receiving the channel allocation information.

2. The wireless communication method according to claim 1, wherein the channel allocated by the channel allocation request is continuously allocated for transmission by the wireless communication apparatus until a channel release request is made.

3. The wireless communication method according to claim 1, wherein the channel allocation request comprises information concerning a time limit for releasing the allocated channel.

4. The wireless communication method according to claim 1, wherein the channel allocation request comprises information representing that the channel allocation request is a continuous channel allocation request over a plurality of frames.

5. The wireless communication method according to claim 1, wherein the channel allocation request comprises information concerning an amount of information to be sent, and a number of continuous frames allocated by the channel allocation request is determined by the information.

6. The wireless communication method according to claim 1, wherein when a continuous channel is allocated for a plurality of frames, information is transmitted and received over the allocated channel even when the network broadcast information transmitted in each frame is not received.

7. The wireless communication method according to claim 1, wherein the channel allocation request comprises information regarding a predetermined start time for the start of the allocation of the channel and information regarding a predetermined termination time for release of the allocated channel.

8. The wireless communication method according to claim 1, further comprising: releasing the allocated channel, using the first wireless communication apparatus, upon the first wireless communication apparatus determining that it is unable to communicate using the allocated channel during a predetermined number of consecutive frame periods within the plurality of consecutive frame periods.

9. A wireless communication system, comprising:
a first wireless communication apparatus and a second wireless communication apparatus each operable to carry out wireless communication over a network using predetermined frame periods set by network broadcast information;

said second wireless communication apparatus being operable to periodically transmit the network broadcast information over the network;

said first wireless communication apparatus being operable to transmit a respective channel allocation request to said second wireless communication apparatus using a portion of one of the predetermined frame periods;

said second wireless communication apparatus being operable to allocate a particular channel to said first wireless communication apparatus for respective parts of each one of a plurality of consecutive frame periods in response to the respective channel allocation request received from said first wireless communication apparatus, to determine whether said first wireless communication apparatus has detached from the network after having transmitted the respective channel allocation request, to release the allocated channel if said first wireless communication apparatus is determined to be detached from the network, to include channel allocation information within a subsequent one of the periodically transmitted network broadcast information if said first wireless communication apparatus is determined to be not detached from the network, the channel allocation information indicating that the particular channel is allocated to said first wireless communication apparatus for the respective parts of the plurality of consecutive frame periods;

said first wireless communication apparatus being operable to carry out wireless communication using the allocated channel in response to receiving the channel allocation information.

10. The wireless communication system according to claim 9, wherein when there is no further information to be transmitted, said first wireless communication apparatus is operable to transmit a channel release request to said second wireless communication apparatus.

11. The wireless communication system according to claim 9, wherein the channel allocation request comprises information concerning a time limit for releasing the allocated channel.

12. The wireless communication system according to claim 9, wherein the channel allocation request comprises information regarding a predetermined start time for the start of the allocation of the channel and information regarding a predetermined termination time for release of the allocated channel 13. The wireless communication system according to claim 9, wherein said first wireless communication apparatus is operable to release the allocated channel upon said first wireless communication apparatus determining that it is unable to communicate using the allocated channel during a predetermined number of consecutive frame periods within the plurality of consecutive frame periods.

14. A wireless communication system, comprising:
a first wireless communication apparatus and a second wireless communication apparatus each including means for carrying out wireless communication over a network using predetermined frame periods set by network broadcast information;

said second wireless communication apparatus including means for periodically transmitting the network broadcast information over the network;

said first wireless communication apparatus including means for transmitting a respective channel allocation request to said second wireless communication apparatus using a portion of one of the predetermined frame periods; and said second wireless communication apparatus including means for allocating a particular channel to the first wireless communication apparatus for respective parts of each one of a plurality of consecutive frame periods in response to receiving the respective channel allocation request from the first wireless communication apparatus, for determining whether the first wireless communication apparatus has detached from the network after having transmitted the respective channel allocation request, for releasing the allocated channel said first wireless communication apparatus is determined to be detached from the network, and for including channel allocation information within a subsequent one of the periodically transmitted network broadcast information if said first wireless communication apparatus is determined to be not detached from the network, the channel allocation information indicating that the particular channel is allocated to said first wireless communication apparatus for the respective parts of the plurality of consecutive frame periods;

said first wireless communication apparatus including means for carrying out wireless communication using the allocated channel in response to receiving the channel allocation information.

15. The wireless communication system according to claim 14, wherein said second wireless communication apparatus further comprises:

means for receiving a channel release request;

means for changing channel allocation in the frame period by the channel release request; and means for transmitting changed channel allocation information.

16. The wireless communication system according to claim 14, wherein the channel allocation request comprises information regarding a predetermined start time for the start of the allocation of the channel and information regarding a predetermined termination time for release of the allocated channel.

17. The wireless communication system according to claim 14, wherein said first wireless communication apparatus includes means for releasing the allocated channel upon said first wireless communication apparatus determining that it is unable to communicate using the allocated channel during a predetermined number of consecutive frame periods within the plurality of consecutive frame periods.

* * * * *